US008886369B2

(12) United States Patent
Sharkany et al.

(10) Patent No.: US 8,886,369 B2
(45) Date of Patent: Nov. 11, 2014

(54) VERTICAL SITUATION AWARENESS SYSTEM FOR AIRCRAFT

(75) Inventors: Frank C. Sharkany, Long Beach, CA (US); John Tarbaux, Highland, CA (US)

(73) Assignee: The Boeing Company, Chicago, IL (US)

( * ) Notice: Subject to any disclaimer, the term of this patent is extended or adjusted under 35 U.S.C. 154(b) by 1224 days.

(21) Appl. No.: 12/703,944

(22) Filed: Feb. 11, 2010

(65) Prior Publication Data

US 2011/0196549 A1    Aug. 11, 2011

(51) Int. Cl.
*G05D 1/00* (2006.01)
*G05D 3/00* (2006.01)
*G01C 23/00* (2006.01)

(52) U.S. Cl.
CPC ...................................... *G01C 23/00* (2013.01)
USPC .......................... 701/8; 701/3; 701/4; 701/14

(58) Field of Classification Search
CPC ....... G08G 5/045; G08G 5/0086; G08G 5/04; G01C 23/00; G05D 1/0202; G05D 1/0676; G09B 29/00
USPC .......................................... 701/3, 4, 8, 14, 17
See application file for complete search history.

(56) References Cited

U.S. PATENT DOCUMENTS

| | | | |
|---|---|---|---|
| 3,666,929 A * | 5/1972 | Menn | 701/16 |
| 4,224,669 A * | 9/1980 | Brame | 701/8 |
| 4,319,219 A | 3/1982 | Rein-Weston | |
| 4,758,839 A | 7/1988 | Goebel et al. | |
| 4,792,906 A * | 12/1988 | King et al. | 701/5 |
| 5,616,031 A | 4/1997 | Logg | |
| 5,936,552 A * | 8/1999 | Wichgers et al. | 340/963 |
| 5,945,926 A * | 8/1999 | Ammar et al. | 340/970 |
| 6,085,129 A | 7/2000 | Schardt et al. | |
| 6,282,466 B1 * | 8/2001 | Nolte et al. | 701/11 |
| 6,292,721 B1 * | 9/2001 | Conner et al. | 701/9 |
| 6,469,640 B2 | 10/2002 | Wyatt | |
| 6,690,298 B1 * | 2/2004 | Barber et al. | 340/971 |
| 6,690,299 B1 | 2/2004 | Suiter | |
| 6,708,091 B2 * | 3/2004 | Tsao | 701/9 |
| 6,720,891 B2 * | 4/2004 | Chen et al. | 340/969 |
| 6,798,423 B2 | 9/2004 | Wilkins, Jr. et al. | |

(Continued)

FOREIGN PATENT DOCUMENTS

EP    2360453 A1    8/2011

OTHER PUBLICATIONS

Spencer, V, "Display of Climb Capability for an Aircraft Based on Potential States for the Aircraft," USPTO U.S. Appl. No. 13/217,773, filed Aug. 25, 2011, 85 pages.

(Continued)

*Primary Examiner* — Khoi Tran
*Assistant Examiner* — Jorge Peche
(74) *Attorney, Agent, or Firm* — Yee & Associates, P.C.

(57) ABSTRACT

A method and apparatus for displaying a predicted path on a vertical profile to operate a vehicle. A path is predicted for the vehicle in response to an event occurring. The path has a turning section and a straight section after the turning section. A portion of terrain relative to the path predicted for the vehicle is identified. A vertical profile view of the terrain is displayed, including the portion of the terrain relative to the path predicted for the vehicle.

20 Claims, 5 Drawing Sheets

(56) References Cited

U.S. PATENT DOCUMENTS

| | | | |
|---|---|---|---|
| 6,833,797 B2 | 12/2004 | Ishihara | |
| 6,879,886 B2 | 4/2005 | Wilkins, Jr. et al. | |
| 6,995,690 B1* | 2/2006 | Chen et al. | 340/974 |
| 6,999,023 B2 | 2/2006 | Block | |
| 7,010,398 B2 | 3/2006 | Wilkins, Jr. et al. | |
| 7,188,007 B2 | 3/2007 | Boorman et al. | |
| 7,219,011 B1* | 5/2007 | Barber | 701/466 |
| 7,346,437 B2* | 3/2008 | Petillon | 701/3 |
| 7,433,781 B2* | 10/2008 | Bitar et al. | 701/454 |
| 7,437,245 B2 | 10/2008 | Ybarra et al. | |
| 7,477,164 B1* | 1/2009 | Barber | 340/945 |
| 7,483,773 B1* | 1/2009 | Tripp | 701/3 |
| 7,584,027 B2* | 9/2009 | Jaillant | 701/3 |
| 7,634,335 B2* | 12/2009 | Bitar et al. | 701/8 |
| 7,675,461 B1* | 3/2010 | McCusker et al. | 342/179 |
| 7,714,744 B1 | 5/2010 | Wichgers | |
| 7,733,243 B2* | 6/2010 | Bitar et al. | 340/961 |
| 7,962,254 B2 | 6/2011 | Bouchet et al. | |
| 8,145,365 B2 | 3/2012 | Flotte et al. | |
| 8,170,728 B2 | 5/2012 | Roesch | |
| 8,374,776 B2 | 2/2013 | Spencer, V | |
| 8,514,105 B1 | 8/2013 | Spencer, V et al. | |
| 2001/0013836 A1* | 8/2001 | Cowie | 340/961 |
| 2002/0022909 A1 | 2/2002 | Karem | |
| 2002/0036574 A1 | 3/2002 | Ishihara | |
| 2003/0006928 A1* | 1/2003 | Szeto et al. | 342/26 |
| 2003/0107499 A1* | 6/2003 | Lepere et al. | 340/945 |
| 2003/0184450 A1 | 10/2003 | Muller et al. | |
| 2003/0193410 A1* | 10/2003 | Chen et al. | 340/971 |
| 2004/0059473 A1* | 3/2004 | He | 701/4 |
| 2005/0051667 A1 | 3/2005 | Arlton et al. | |
| 2006/0005147 A1 | 1/2006 | Hammack et al. | |
| 2006/0161336 A1* | 7/2006 | Wischmeyer | 701/200 |
| 2006/0250280 A1* | 11/2006 | Chen et al. | 340/974 |
| 2006/0273929 A1* | 12/2006 | Tran | 340/961 |
| 2007/0055418 A1 | 3/2007 | Pire et al. | |
| 2007/0164167 A1 | 7/2007 | Bachelder et al. | |
| 2007/0219705 A1* | 9/2007 | Bitar et al. | 701/200 |
| 2008/0004801 A1* | 1/2008 | Bitar et al. | 701/208 |
| 2008/0046171 A1* | 2/2008 | Bitar et al. | 701/208 |
| 2008/0103643 A1* | 5/2008 | Artini | 701/8 |
| 2008/0294305 A1 | 11/2008 | Roesch | |
| 2008/0312781 A1* | 12/2008 | Nikolic et al. | 701/14 |
| 2009/0055037 A1* | 2/2009 | Dupre et al. | 701/14 |
| 2009/0157241 A1* | 6/2009 | Meunier et al. | 701/9 |
| 2009/0212157 A1 | 8/2009 | Arlton et al. | |
| 2009/0218439 A1 | 9/2009 | Carlson | |
| 2009/0267800 A1 | 10/2009 | Hammack et al. | |
| 2009/0312893 A1* | 12/2009 | Dwyer et al. | 701/14 |
| 2009/0319103 A1* | 12/2009 | Dwyer et al. | 701/14 |
| 2010/0030401 A1* | 2/2010 | Rogers et al. | 701/3 |
| 2010/0161155 A1 | 6/2010 | Simeray | |
| 2010/0265268 A1* | 10/2010 | Wilson et al. | 345/619 |
| 2010/0312421 A1 | 12/2010 | Eglin | |
| 2012/0209457 A1* | 8/2012 | Bushnell | 701/13 |

OTHER PUBLICATIONS

Notice of Allowance, dated Jan. 2, 2013, regarding USPTO U.S. Appl. No. 12/761,184, 7 pages.
EP Search Report dated May 16, 2011, regarding Application No. EP11153457.
"T2CAS Product Description", AviationCommunication & Surveillance Systems, May 2003, pp. 1-15 www.L-3comm.com/acss.
"Height-velocity diagram", Wikipedia, pp. 1-2, retrieved Aug. 30, 2010 http://en.wikipedia.org/wiki/Height-velocity_diagram.
"File:Hvcurve.png", Wikipedia, pp. 1-3, retrieved Sep. 7, 2010 http://en.wikipedia.org.wikiFile:Hvcurve.png.
U.S. Appl. No. 12/761,184, filed Apr. 15, 2010, Spencer, V et al.
U.S. Appl. No. 13/015,215, filed Jan. 27, 2011, Spencer V et al.
U.S. Appl. No. 12/751,144, filed Mar. 31, 2010, Spencer V et al.
Office Action, dated Jun. 19, 2013, regarding USPTO U.S. Appl. No. 13/015,215, 20 pages.
Notice of Allowance, dated Sep. 17, 2013, regarding USPTO U.S. Appl. No. 13/217,773, 9 pages.
Office Action, dated Dec. 5, 2013, regarding USPTO U.S. Appl. No. 13/015,215, 14 pages.
Notice of Allowance, dated Mar. 20, 2014, regarding USPTO U.S. Appl. No. 13/015,215, 9 pages.

* cited by examiner

VERTICAL SITUATION AWARENESS SYSTEM FOR AIRCRAFT

BACKGROUND INFORMATION

1. Field

The present disclosure relates generally to aircraft and, in particular, to a method and apparatus for displaying a predicted during flight of an aircraft. Still more particularly, the present disclosure relates to a method and apparatus for displaying a predicted path for vertical situation awareness during flight of an aircraft.

2. Background

In operating an aircraft, a pilot may use a flight management system to control navigation of the aircraft. A flight management system is a computer system that holds information, such as a flight plan. The flight management system also may work in conjunction with a navigation display. The navigation display presents information to the pilot for use in operating the aircraft.

In operating the aircraft, the pilot uses information, such as maps. Maps may be presented on a navigation display system. These maps may present information, such as, for example, terrain, airspace boundaries, radio frequencies, and other suitable information.

Maps can be presented in a number of different ways. For example, a map may be presented in a top view. This top view also may be referred to as a plan view. The top view illustrates the terrain and other information from an observer looking downwards to the ground.

Another view that may be presented to a pilot is a vertical profile view. A vertical profile view shows a view from a side of an aircraft. In other words, a vertical profile view may be a cross-section through a topographical view. A map in a vertical profile view may present terrain in a manner that allows a pilot to avoid obstacles during flight that may be at elevations near the flight level of the aircraft.

Different types of aircraft may fly close to or follow the terrain to perform different types of operations. As one example, agricultural aircraft often fly at low altitudes over fields to apply pesticides to crops. Some types of passenger and freight aircraft fly close to high-elevation airports to deliver passengers and/or cargo. Fire fighting air tankers fly close to the terrain to drop water or fire retardant materials onto or around a fire.

The presentation of maps in the different views provides useful information for operating aircraft. The use of electronic maps with the different views, however, may not always provide the amount or type of information desired by a pilot or other operator of an aircraft.

Accordingly, it would be advantageous to have a method and apparatus which takes into account one or more of the issues discussed above, as well as possibly other issues.

SUMMARY

In one advantageous embodiment, a method is present for displaying a predicted path on a vertical profile to operate an aircraft. A path for the aircraft is predicted in response to an event occurring. The path has a turning section and a straight section after the turning section. A portion of terrain under the path predicted for the aircraft is identified. A vertical profile view of the terrain is displayed, including the portion of the terrain under the path predicted for the aircraft.

In another advantageous embodiment, an apparatus comprises a storage device, program code located on the storage device, and a processor unit. The processor unit is configured to run the program code to predict a path for an aircraft in response to an event occurring. The path has a turning section and a straight section after the turning section. The program code is run to identify a portion of terrain under the path predicted for the aircraft. The program code is run to display a vertical profile view of the terrain including the portion of the terrain under the path predicted for the aircraft.

In yet another advantageous embodiment, a computer program product comprises a computer recordable storage medium and program code, which is stored on the computer recordable storage medium. Program code is run to predict a path for an aircraft in response to an event occurring. The path has a turning section and a straight section after the turning section. Program code is run to identify a portion of terrain under the path predicted for the aircraft. Program code is run to display a vertical profile view of the terrain, including the portion of the terrain under the path predicted for the aircraft.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
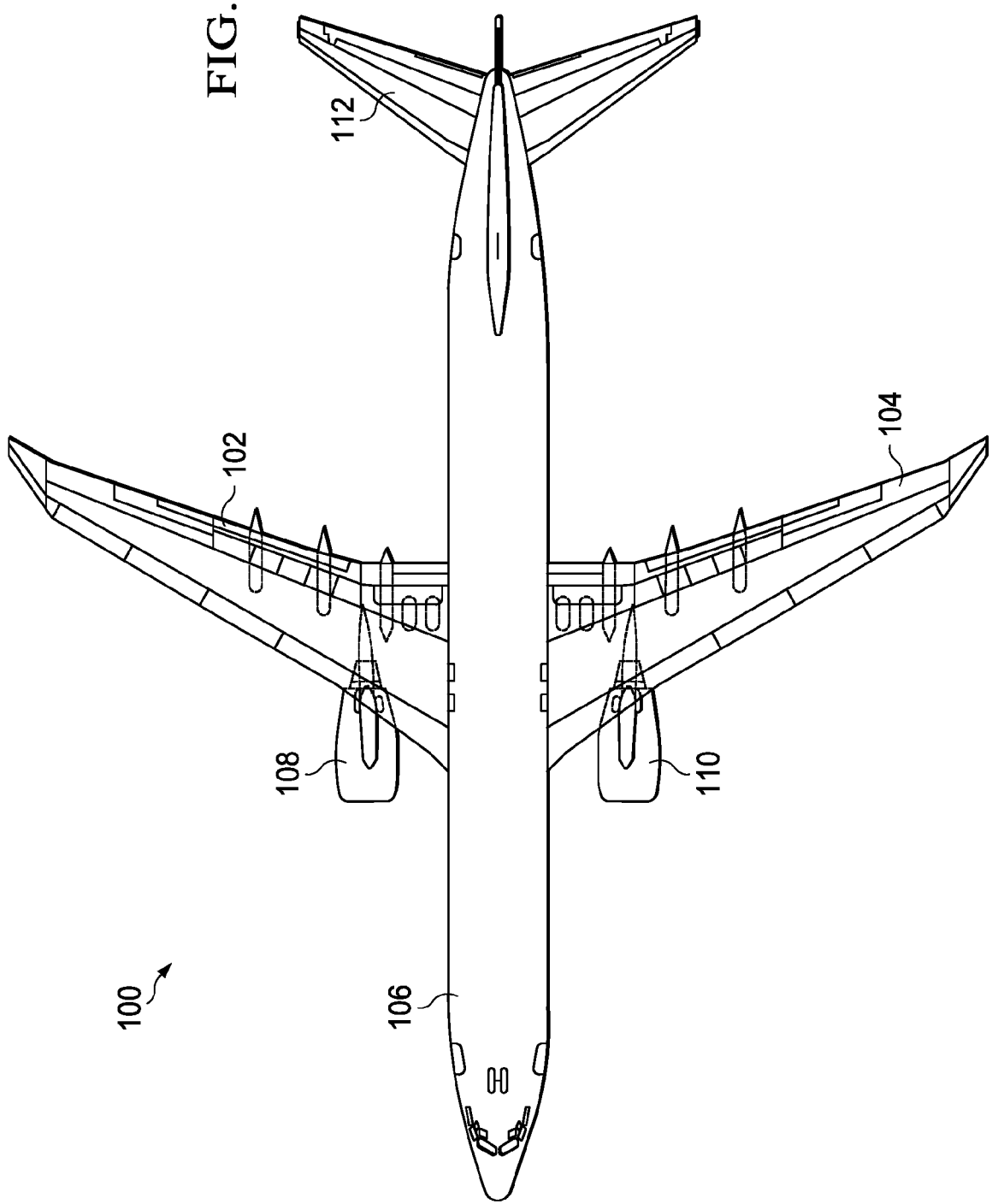
FIG. 1 is an illustration of an aircraft in which an advantageous embodiment may be implemented.

With reference now to the figures, and in particular, with reference to FIG. 1, an illustration of an aircraft is depicted in which an advantageous embodiment may be implemented. In this illustrative example, aircraft 100 has wings 102 and 104 attached to body 106. Aircraft 100 includes wing mounted engine 108, wing mounted engine 110, and tail 112.

Aircraft 100 is an example of an aircraft in which a number of advantageous embodiments that provide information for operating aircraft 100 may be implemented. A number, as used herein with reference to items, means one or more items. For example, a number of advantageous embodiments is one or more advantageous embodiments.

Aircraft 100 includes a process and/or apparatus that provides vertical situation awareness for a pilot of aircraft 100. In the different advantageous embodiments, a profile view of information may be provided in aircraft 100 for use by a pilot in operating aircraft 100.

Figure 2:
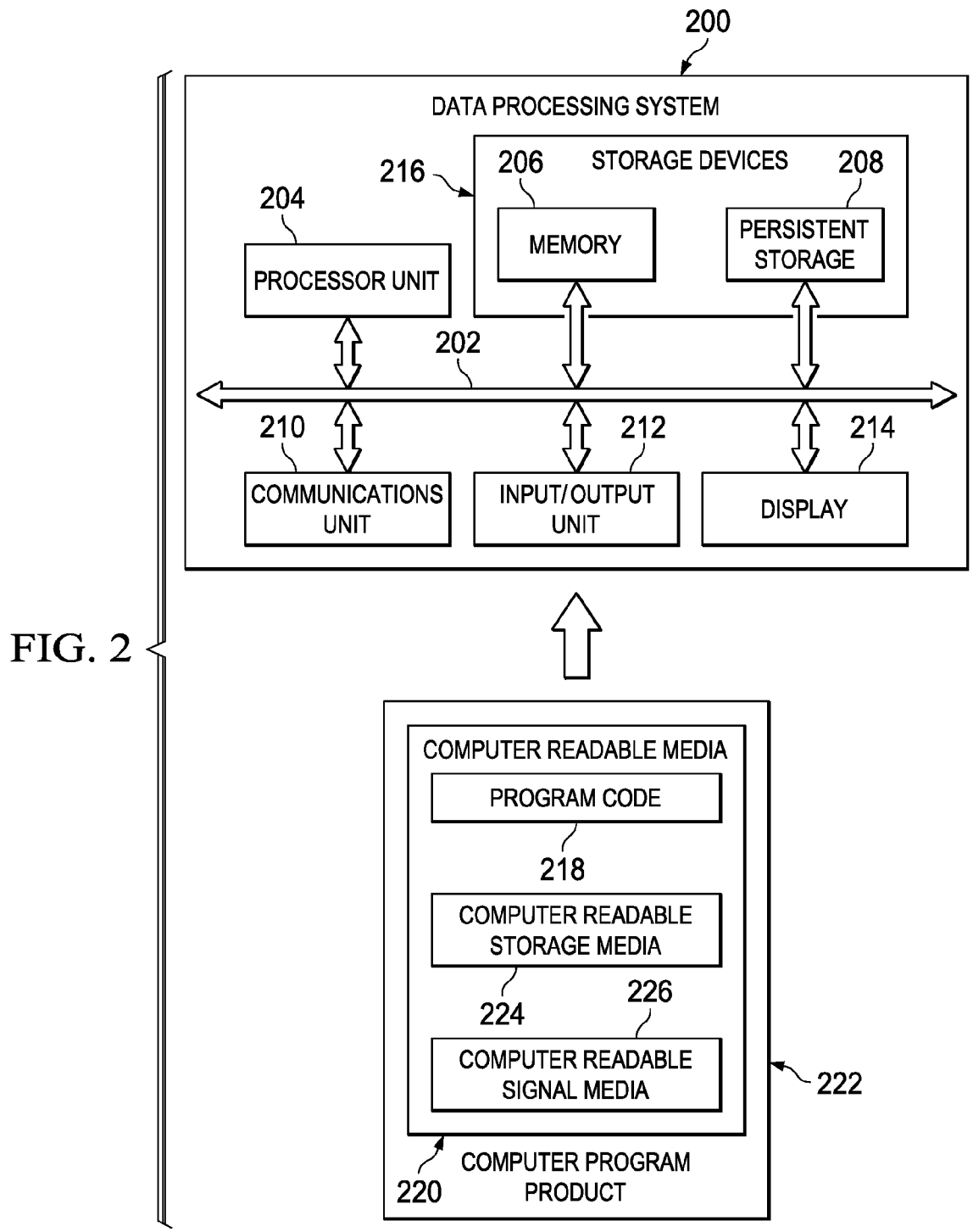
FIG. 2 is an illustration of a data processing system in accordance with an advantageous embodiment.

Turning now to FIG. 2, an illustration of a data processing system is depicted in accordance with an advantageous embodiment. Data processing system 200 is an example of a data processing system that may be found within aircraft 100 in FIG. 1. Data processing system 200 may be used to implement a number of processes to provide vertical situation awareness for pilots operating aircraft 100 in FIG. 1. In this illustrative example, data processing system 200 includes communications fabric 202, which provides communications between processor unit 204, memory 206, persistent storage 208, communications unit 210, input/output (I/O) unit 212, and display device 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display device 214 provides a mechanism to display information to a user, such as a pilot.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226.

Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown.

The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

The different advantageous embodiments recognize and take into account a number of different considerations. For example, the different advantageous embodiments recognize and take into account that although vertical profile views provide information about terrain that may be encountered by an aircraft, the currently used vertical profile views may not provide sufficient information needed to operate an aircraft in some instances.

For example, the different advantageous embodiments recognize and take into account that the vertical profile views that are currently used provide a view of the terrain directly ahead of an aircraft. In other words, the vertical profile view displays terrain in the direction that the aircraft is currently pointed. In some cases, the vertical profile view may provide information about terrain along a planned route, which may include turns. In this type of display, the vertical profile view presents terrain that is directly along the route of the aircraft.

In some cases, the aircraft may not have a route that is planned. For example, without limitation, agricultural aircraft and fire fighting air tankers often fly without a planned route. In this case, the currently available systems display a vertical profile view of only what is directly in front of the aircraft in its current heading. As a result, a pilot of an aircraft in these types of situations may be unable to identify the terrain that would be present after a turn is completed in a manner that is as quick as desired.

The different advantageous embodiments recognize and take into account that currently available processes and systems for displaying profile views do not take into account when a pilot will roll out of a turn and straighten again into level flight. The currently presented information does not present information about where the turn may complete. Thus, a pilot may end up turning in a location that may result in the aircraft being closer to the terrain than desired. The different advantageous embodiments recognize and take into account that currently a pilot may decide when to turn with respect to a top view of the terrain.

Thus, a number of the different advantageous embodiments provide a method and apparatus for displaying a predicted path on a vertical profile to operate an aircraft. In response to an event occurring, a path is predicted for the aircraft in which the path has a turning section and a straight section after the turning section. A portion of the terrain under the path predicted for the aircraft is identified. A vertical profile view of the terrain, including the portion of the terrain under the path predicted for the aircraft, is displayed.

Figure 3:
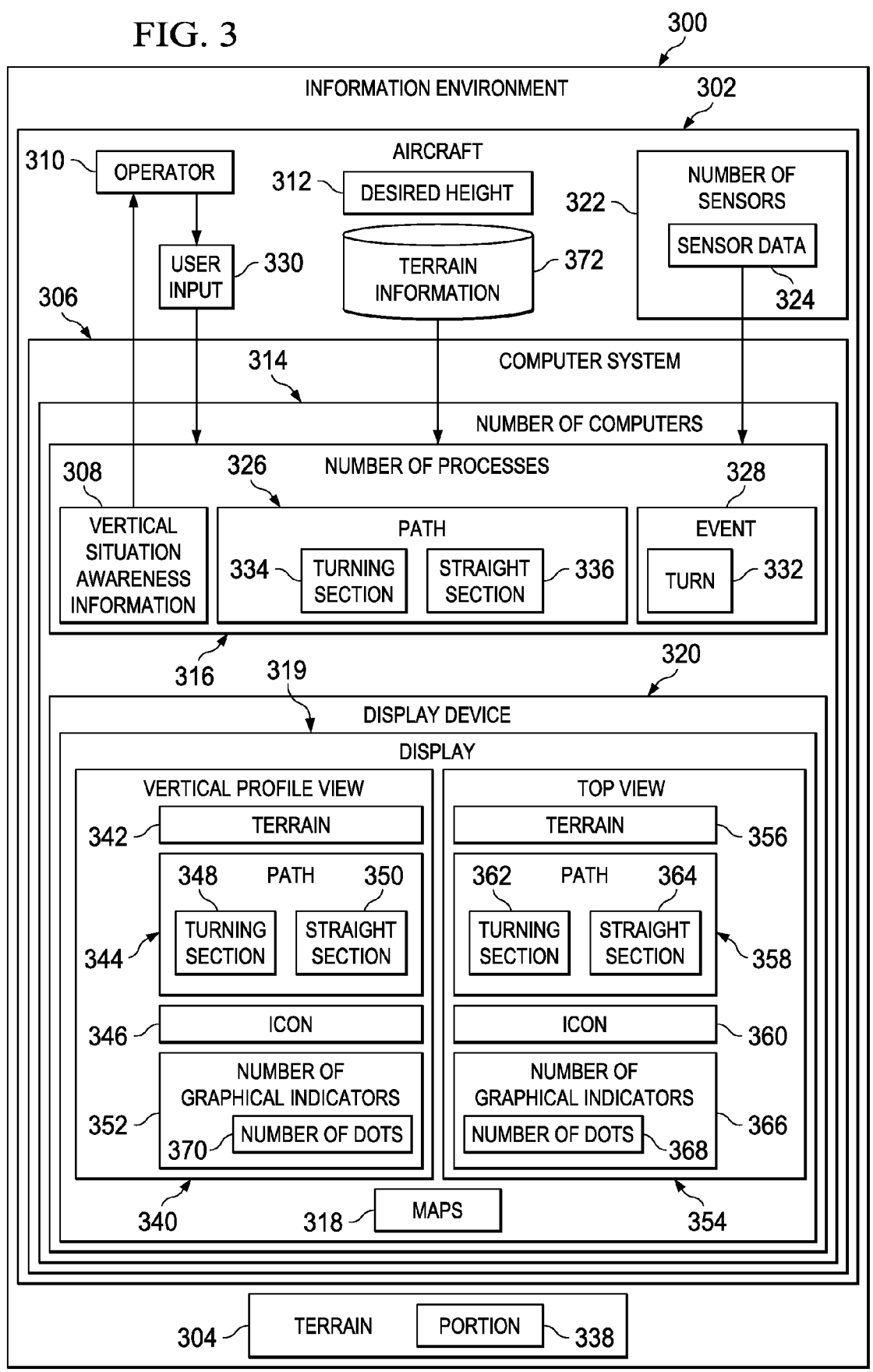
FIG. 3 is an illustration of an information environment in accordance with an advantageous embodiment.

With reference now to FIG. 3, an illustration of an information environment is depicted in accordance with an advantageous embodiment. Information environment 300 includes aircraft 302, which flies over terrain 304. Aircraft 302 may be implemented using aircraft 100 in FIG. 1.

In this illustrative example, computer system 306 provides vertical situation awareness information 308 to operator 310. Operator 310, in these examples, may be a pilot, a co-pilot, or some other crew member in aircraft 302. Vertical situation awareness information 308 is information that may be used by operator 310 to operate aircraft 302. For example, vertical situation awareness information 308 provides operator 310 an ability to determine when to make turns. The turns may be made in a manner that allows the aircraft to be at desired height 312 during various maneuvers of aircraft 302.

In these illustrative examples, computer system 306 comprises number of computers 314. Number of computers 314 may be in communication with each other in these examples. The communication may be provided through a network and/or other type of communications mechanism. Number of computers 314 may be implemented using a data processing system, such as data processing system 200 in FIG. 2.

In this illustrative example, number of processes 316 runs on number of computers 314 in computer system 306. Number of processes 316 displays maps 318 in display 319 on display device 320. In these illustrative examples, number of processes 316 may be part of a moving map application.

As depicted, computer system 306 is connected to number of sensors 322. Number of sensors 322 may include, for example, without limitation, at least one of a global positioning satellite system, an inertial navigation unit, accelerometers, and other suitable types of sensors. In these examples, number of sensors 322 provides sensor data 324 to number of processes 316.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

In these illustrative examples, number of processes 316 predicts path 326 for aircraft 302 in response to event 328. Event 328 may be, for example, identified using at least one of sensor data 324 and user input 330 received in computer system 306. User input 330 is provided by operator 310.

When sensor data 324 is used, event 328 may be an identification of a beginning of turn 332 for aircraft 302. For example, without limitation, sensor data 324 may identify that aircraft 302 is no longer flying straight, but turning. As another example, sensor data 324 may indicate that aircraft 302 has a roll angle that is greater than a threshold. This threshold may be, for example, without limitation, about 0.5 degrees.

When event 328 takes the form of user input 330, the user input may be, for example, the push of a button, the selection of a function on a navigation screen, or some other type of user input. User input 330 may, for example, indicate that a turn will begin after some period of time. For example, user input 330 may indicate that a turn will begin in about five seconds, 10 seconds, or some other period of time. Additionally, user input 330 also may indicate where a turn will begin.

Path 326, as predicted by number of processes 316, has turning section 334 and straight section 336 in these illustrative examples. Straight section 336 is located after turning section 334. Path 326 may be predicted in a number of different ways.

For example, number of processes 316 may select turning section 334 in path 326 as a preset or default turn. For example, the turn may be a 30 second turn with aircraft 302 then returning to straight flight. The straight flight, in these depicted examples, is represented by straight section 336.

The duration or length of the turn, the steepness or angle of the turn, and/or other parameters for the turn may be based on a number of variables. For example, the parameters for the turn may be identified based on at least one of the particular type of aircraft 302, the speed at which aircraft 302 is currently traveling, user input 330, and some other suitable variable.

Straight section 336 may be selected as having a preset length. For example, straight section 336 may have a length of about one nautical mile, three nautical miles, or some other suitable distance.

Number of processes 316 also identifies portion 338 of terrain 304 that is under path 326 predicted for aircraft 302 in these examples. Number of processes 316 displays vertical profile view 340 of terrain 304 in display 319 on display device 320.

For example, vertical profile view 340 includes terrain 342, path 344, and icon 346. Icon 346 represents aircraft 302 relative to terrain 342.

Terrain 342 is a display of portion 338 of terrain 304 under path 326 predicted for aircraft 302. Path 344 is a visual representation of path 326 that aircraft 302 is predicted to fly over terrain 304. Path 344 is displayed relative to terrain 342 displayed in vertical profile view 340. Path 344 has turning section 348 and straight section 350.

Number of graphical indicators 352 also is displayed in vertical profile view 340 in these illustrative examples. Number of graphical indicators 352 may be used to indicate turning section 348 and straight section 350 for path 344.

Number of graphical indicators 352 may take a number of different forms. For example, number of graphical indicators 352 may comprise at least one of color, bolding, cross hatching, colored lines, icons, and/or other suitable types of graphical indicators.

In some advantageous embodiments, number of processes 316 also displays top view 354 in display 319 on display device 320. Top view 354 includes terrain 356, path 358, and icon 360.

Terrain 356 represents terrain 304 and includes portion 338 of terrain 304. Icon 360 represents aircraft 302 relative to the location of aircraft 302. Path 358 includes turning section 362 and straight section 364. Path 358 is a visual depiction of path 326 in top view 354 as predicted for aircraft 302.

In these illustrative examples, number of graphical indicators 366 also may be displayed in association with path 358. Number of graphical indicators 366 may be used to correspond top view 354 with vertical profile view 340. In other words, number of graphical indicators 366 may be used to relate top view 354 and vertical profile view 340 to each other.

For example, in some advantageous embodiments, number of graphical indicators 366 may take the form of number of dots 368 on path 358. With this type of implementation, number of graphical indicators 352 also includes number of dots 370 on path 344. Each dot in number of dots 368 displayed on path 358 in top view 354 corresponds to a dot in number of dots 370 displayed on path 344 in vertical profile view 340.

In these illustrative examples, these dots may represent points over different periods of time. For example, one dot may represent 10 seconds, a second dot may represent 20 seconds, and a third dot may represent 30 seconds ahead of aircraft 302. In other illustrative examples, the dots may represent distances instead of time.

In different advantageous embodiments, terrain 304 may be identified by number of processes 316 in a number of different ways. For example, number of sensors 322 may include a radar system. The radar system may be directed to obtain information about terrain 304 along path 326 as predicted for aircraft 302. In this manner, the radar system may provide information about terrain 304 for use in generating vertical profile view 340 and top view 354.

In yet other advantageous embodiments, terrain information 372 may be used in conjunction with a location of aircraft 302 to identify terrain 304 for display in vertical profile view 340 and top view 354. Terrain information 372 may be, for example, without limitation, a database of digital terrain information. This database may be a database of information containing elevations, identifications of terrain, and/or other suitable information. This type of information may be obtained from a third party service or provider.

Thus, with one or more of the different advantageous embodiments, operator 310 may make decisions about the operation of aircraft 302 using vertical profile view 340 and/or top view 354 as displayed on display device 320 in information environment 300. With this information, operator 310 may make decisions as to whether to continue on a turn, abort a turn, alter a turn, or perform some other operation using aircraft 302. With this information, operator 310 may make a more accurate decision with respect to turns of aircraft 302 because of the information about terrain 304 relative to aircraft 302 with a predicted path of aircraft 302 for the turn.

The illustration of information environment 300 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, the different processes may be applied to vehicles other than aircraft. For example, in some advantageous embodiments, information environment 300 may be applied to spacecraft, submarines, surface ships, and other suitable types of vehicles in which vertical situation awareness is desired.

Figure 4:
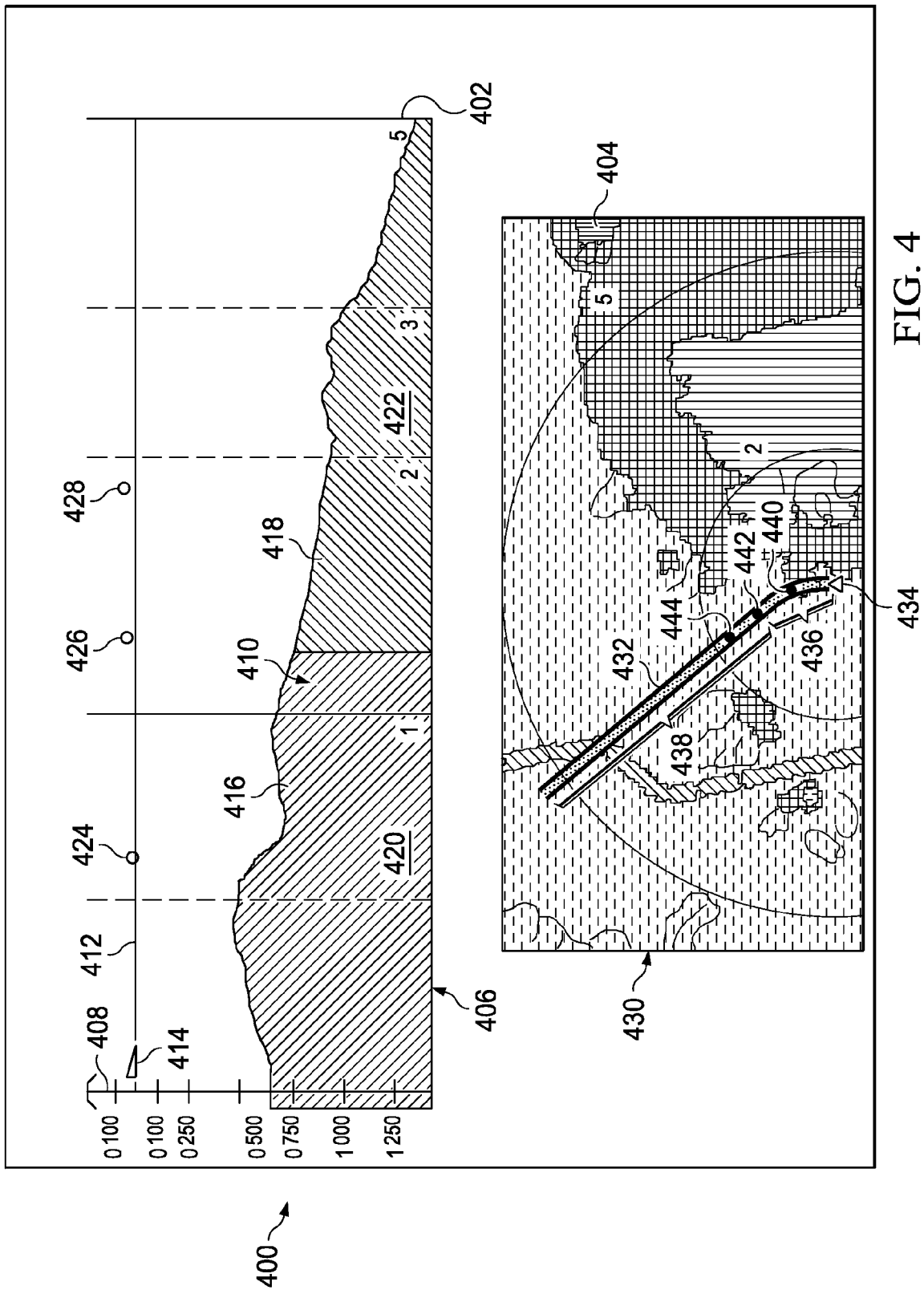
FIG. 4 is an illustration of terrain displayed on a display device in accordance with an advantageous embodiment.

With reference now to FIG. 4, an illustration of terrain displayed on a display device is depicted in accordance with an advantageous embodiment. Display 400 is an example of one implementation for display 319 presented on display device 320 in FIG. 3.

In this illustrative example, display 400 includes vertical profile view 402 and top view 404. In this illustrative example, horizontal axis 406 represents distance, while vertical axis 408 represents altitude. Horizontal axis 406 represents a distance ahead of the aircraft, while vertical axis 408 indicates altitudes above and below the aircraft.

Vertical profile view 402 includes terrain 410, path 412, and icon 414. Terrain 410 represents a profile view of terrain over a path predicted for an aircraft. This profile view is a cross-sectional side view of the terrain over the path predicted for the aircraft.

In this illustrative example, icon 414 is displayed at the current altitude of the aircraft. Values for distances on horizontal axis 408 are relative to the aircraft in this example.

Path 412 represents the path of the aircraft in vertical profile view 402. Icon 414 represents the location of the aircraft relative to terrain 410. This location is with respect to distance away and altitude with respect to terrain 410 as displayed in display 400. In these illustrative examples, path 412 has turning section 416 and straight section 418. Straight section 418 is located after turning section 416 with respect to the aircraft in these examples.

As depicted, turning section 416 and straight section 418 for path 412 are indicated using graphical indicator 420 and graphical indicator 422. In these illustrative examples, graphical indicator 420 and graphical indicator 422 take the form of color in the presentation of terrain 410.

Of course, other types of graphical indicators may be used. For example, cross hatching, colored lines on the top of terrain 410, and other suitable graphical indicators may be used. As another example, path 412 may be shown in different colors or with different types of lines to indicate turning section 416 and straight section 418.

In these illustrative examples, turning section 416 and straight section 418 in path 412 are for terrain that is not directly in front of the aircraft. In other words, terrain 410, shown for turning section 416 and straight section 418, is not shown in the direction in which the aircraft is currently pointed in these examples.

Instead, terrain 410, shown for these two sections, is for terrain that the aircraft is predicted to fly over in making a turn and then returning to straight flight. In this manner, a pilot may be able to determine whether to finish and/or change the turn based on the projected terrain that will be encountered by the aircraft.

In these illustrative examples, dots 424, 426, and 428 are displayed on path 412. These dots indicate distances ahead of the aircraft. These distances are selected based on a period of time ahead of the aircraft. For example, dot 424 represents 10 seconds, dot 426 represents 20 seconds, and dot 428 represents 30 seconds ahead of the aircraft. In other words, these dots indicate where the aircraft will be in a period within some period of time based on the current airspeed of the aircraft.

In top view 404, terrain 430, path 432, and icon 434 are displayed in display 400. Icon 434 represents the aircraft. Icon 434 is displayed in a position on terrain 430 based on the current location of the aircraft. Additionally, icon 434 also may indicate a heading or direction of the aircraft.

In this illustrative example, path 432 in top view 404 corresponds to path 412 in vertical profile view 402. Path 432 is a predicted path for the aircraft. As depicted, path 432 has turning section 436 and straight section 438.

Additionally, dots 440, 442, and 444 are displayed on path 432. These dots are graphical indicators that correspond to dots 424, 426, and 428 in vertical profile view 402. These dots illustrate distances ahead of the aircraft and represent where the aircraft will be within some period of time as described above.

With the use of dots 424, 426, 428, 440, 442, and 444, vertical profile view 402 may be correlated with top view 404. In this manner, additional information may be presented to a pilot in operating an aircraft using display 400.

The illustration of display 400 in FIG. 4 is not meant to imply physical or architectural limitations to the manner in which different displays may be used to present information to operate an aircraft. For example, in other advantageous embodiments, only vertical profile view 402 may be used. In yet other examples, dots 424, 426, 428, 440, 442, and 444 may be omitted. These dots also may be associated with path 412 and path 432 in other ways. As one example, these dots may be displayed beside the path, with a lead line to the path, and/or in some other suitable manner.

Also, other types of graphical indicators, other than dots, may be used. For example, diamonds, x's, colored segments, or other types of graphical indicators may be used. In still other illustrative examples, the altitude on vertical axis 408 may be relative to the ground, rather than the aircraft.

Figure 5:
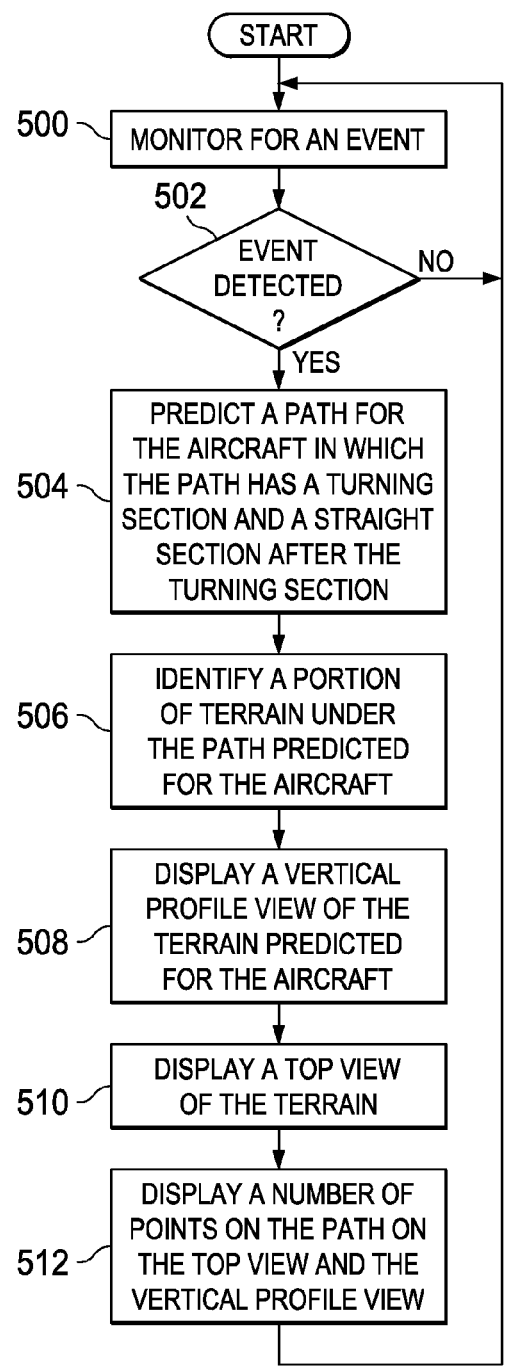
FIG. 5 is an illustration of a flowchart of a process for displaying a predicted path on a vertical profile to operate an aircraft in accordance with an advantageous embodiment.

With reference now to FIG. 5, an illustration of a flowchart of a process for displaying a predicted path on a vertical profile to operate an aircraft is depicted in accordance with an advantageous embodiment. FIG. 5 is an illustration of a process that may be implemented in information environment 300 in FIG. 3. In particular, the process illustrated in FIG. 5 may be implemented in number of processes 316 running on computer system 306 in aircraft 302 in FIG. 3.

The process begins by monitoring for an event (operation 500). This event may take various forms. For example, the event may be the aircraft having a roll angle over a threshold. This threshold may be used to indicate when a turn is beginning for the aircraft. In other illustrative examples, the event may be a user input requesting information for a turn. A determination is then made as to whether an event has been detected (operation 502). If an event has not been detected, the process returns to operation 500.

Otherwise, the process predicts a path for the aircraft in which the path has a turning section and a straight section after the turning section (operation 504). The process then identifies a portion of terrain under the path predicted for the aircraft (operation 506). The process displays a vertical profile view of the terrain including the portion of the terrain under the path predicted for the aircraft (operation 508). Of course, in some advantageous embodiments, the display of a path predicted of the aircraft also may be displayed with a straight section prior to the turn, depending on when the turn is predicted to occur.

Thereafter, the process displays a top view of the terrain (operation 510). The process also displays a number of points on the path on the top view and the vertical profile view (operation 512), with the process then returning to operation 500. These points may be used to correlate the information in the top view and the profile view to each other.

Figure 6:
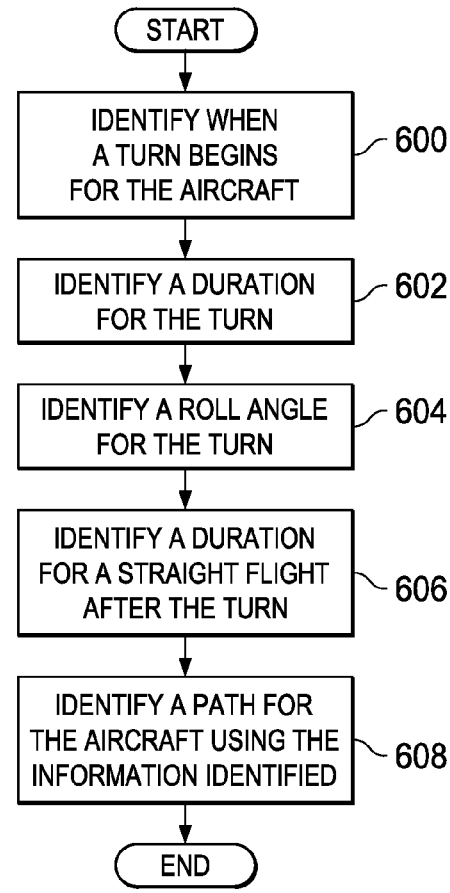
FIG. 6 is an illustration of a flowchart of a process for predicting a path for an aircraft in accordance with an advantageous embodiment.

Turning now to FIG. 6, an illustration of a flowchart of a process for predicting a path for an aircraft is depicted in accordance with an advantageous embodiment. The process illustrated in FIG. 6 is an example of one manner in which operation 504 in FIG. 5 may be implemented.

The process begins by identifying when a turn begins for the aircraft (operation 600). In operation 600, the aircraft may already have begun a turn. In other advantageous embodiments, the turn may be predicted or identified to occur within some distance or period of time. For example, user input may be used to indicate that a turn is to begin in about five seconds, 10 seconds, or some other period of time. In other advantageous embodiments, the turn may be identified based on a distance instead of a period of time.

After identifying when the turn begins, the process identifies a duration for the turn (operation 602). The process also identifies a roll angle for the turn (operation 604). The duration and angle for the turn may be parameters set for a particular aircraft. In some advantageous embodiments, these parameters may be input by a user.

Further, these parameters also may be selected by detecting at least one of the current roll angle of the aircraft, the current speed of the aircraft, and other suitable information. Thereafter, the process identifies a duration for a straight flight after the turn (operation 606). Operation 606 may be identified through default parameters or user input. The process then identifies a path for the aircraft using the information identified (operation 608), with the process terminating thereafter.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, in some advantageous embodiments, the top view and the dots may be unnecessary. As another example, operation 508 and operation 510 in FIG. 5 may be performed simultaneously or in the reverse order.

Thus, the different advantageous embodiments provide a method and apparatus for displaying a predicted path on a vertical profile to operate an aircraft. Responsive to an event occurring, a path is predicted for the aircraft in which the path has a turning section and a straight section after the turning section. A portion of the terrain and the path predicted for the aircraft are identified. A vertical profile view of the terrain, including the portion of the terrain under the path predicted for the aircraft, is displayed.

As another example, in some advantageous embodiments, the different processes may be applied to providing vertical situation awareness information to vehicles other than aircraft. For example, the different advantageous embodiments may be applied to other vehicles, such as, for example, submarines, ships, spacecraft, and other suitable types of vehicles. With these other types of vehicles, the portion of the terrain identified for the path predicted for the vehicle is relative to the vehicle. With other types of vehicles, the terrain may be above and/or under the vehicle.

For example, with a submarine, the terrain may be above the submarine, below the submarine, or a combination of both. For example, if the submarine is moving under ice, the terrain is above the submarine. Additionally, the floor of the ocean is below the submarine. As a result, terrain may be identified both above and below the submarine.

In this manner, increased vertical situation awareness may be provided to a pilot when operating an aircraft. The different advantageous embodiments predict a path that the aircraft will travel when a turn begins. In these illustrative examples, a default or standard term may be selected for the particular aircraft or pilot. A straight section is projected after the turn completes.

The different advantageous embodiments provide a pilot capability to view on a vertical profile the terrain that the aircraft is predicted to fly over or near during a turn and after a turn is completed. In this manner, a pilot may determine whether to complete the turn based on the amount of distance between the aircraft and the terrain. In some cases, the pilot also may climb while turning.

In other cases, the turn may be aborted or changed, based on the terrain that will be encountered in the predicted path. In this manner, the different advantageous embodiments may provide information about the terrain on a profile view during turning maneuvers and rolling out from turning maneuvers in a manner that allows a pilot to make decisions about whether to and/or how to make a turn.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories, which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for displaying a predicted path on a vertical profile to operate an aircraft, the method comprising:
    responding to an event occurring by predicting, by a processor, a path for the aircraft, wherein the event comprises an identification of a beginning of a turn for the aircraft;
    identifying, by the processor, a portion of terrain under the path predicted for the aircraft; and
    displaying, on a display device in communication with the processor, a vertical profile view of a terrain including the portion of the terrain under the path predicted for the aircraft, wherein the vertical profile view comprises a turning section displaying a first vertical profile of first terrain predicted to be in the path while the aircraft is turning, and wherein the vertical profile view further comprises a straight section displaying a second vertical profile of second terrain predicted to be in the path when the aircraft is predicted to return to a straight path, and wherein the straight section is displayed next to and after the turning section.

2. The method of claim 1 further comprising:
identifying a number of points in the path predicted for the aircraft;
displaying the path on a top view of the terrain; and
displaying the number of points on the path on the top view and the vertical profile view.

3. The method of claim 2, wherein the number of points represents a location of the aircraft over a number of times.

4. The method of claim 1, wherein the step of displaying the vertical profile view comprises:
displaying a graphical indicator in association with the portion of the terrain under the straight section, wherein the graphical indicator identifies the straight section.

5. The method of claim 4, wherein the graphical indicator is selected from at least one of a color, a cross-hatching, shading, and a line following a top portion of the terrain.

6. The method of claim 1, wherein the in-flight event is selected from one of a roll angle of the aircraft exceeding a threshold and a user input.

7. The method of claim 1, wherein the step of identifying the portion of the terrain under the path predicted for the aircraft comprises:
identifying the portion of the terrain under the path predicted for the aircraft using the information from a digital terrain database.

8. The method of claim 1, wherein the step of identifying the portion of the terrain under the path predicted for the aircraft comprises:
identifying the portion of the terrain under the path predicted for the aircraft using an information from a radar system directed at the portion of the terrain under the path predicted for the aircraft.

9. The method of claim 1, wherein the turning section has a length that will be traversed by the aircraft within a selected period of time based on a current state of the aircraft.

10. An apparatus comprising:
a storage device;
program code located on the storage device;
a processor unit configured to run the program code to:
predict a path for an aircraft in response to an event occurring, wherein the event comprises an identification of a beginning of a turn for the aircraft;
identify a portion of terrain under the path predicted for the aircraft; and
display a vertical profile view of the terrain including the portion of the terrain under the path predicted for the aircraft, wherein the vertical profile view comprises a turning section displaying a first vertical profile of first terrain predicted to be in the path while the aircraft is turning, and wherein the vertical profile view further comprises a straight section displaying a second vertical profile of second terrain predicted to be in the path when the aircraft is predicted to return to a straight path, and wherein the straight section is displayed next to and after the turning section.

11. The apparatus of claim 10, wherein the processor unit runs the program code to identify a number of points in the path predicted for the aircraft; display the path on a top view of the terrain; and display the number of points on the path on the top view and the vertical profile view.

12. The apparatus of claim 11, wherein the number of points represents a location of the aircraft over a number of times.

13. The apparatus of claim 10, wherein the processor unit is further configured to run the program code to display a graphical indicator in association with the portion of the terrain under the straight section, wherein the graphical indicator identifies the straight section.

14. The apparatus of claim 13, wherein the graphical indicator is selected from at least one of a color, a cross-hatching, shading, and a line following a top portion of the terrain.

15. The apparatus of claim 10, wherein the in-flight event is selected from one of a turning of the aircraft exceeding a threshold and a user input.

16. The apparatus of claim 10, wherein the processor unit is further configured to run the program code to identify the portion of the terrain under the path predicted for the aircraft using information from a digital terrain database.

17. The apparatus of claim 10, the processor unit is further configured to run the program code to identify the portion of the terrain under the path predicted for the aircraft using information from a radar system directed at the portion of the terrain under the path predicted for the aircraft.

18. The apparatus of claim 10, wherein the turning section has a length that will be traversed by the aircraft within a selected period of time based on a current state of the aircraft.

19. A non-transitory computer readable storage medium storing program code, which when executed by a processor, performs a computer-implemented method, the program code comprising:
program code configured to predict a path for an aircraft responsive to an event occurring, wherein the event comprises an identification of a beginning of a turn for the aircraft;
program code configured to identify a portion of terrain under the path predicted for the aircraft; and
program code configured to display a vertical profile view of the terrain including the portion of the terrain under the path predicted for the aircraft, wherein the vertical profile view comprises a turning section displaying a first vertical profile of first terrain predicted to be in the path while the aircraft is turning, and wherein the vertical profile view further comprises a straight section displaying a second vertical profile of second terrain predicted to be in the path when the aircraft is predicted to return to a straight path, and wherein the straight section is displayed next to and after the turning section.

20. The non-transitory computer readable storage medium of claim 19 further comprising:
program code configured to identify a number of points in the path predicted for the aircraft;
program code configured to display the path on a top view of the terrain; and
program code configured to display the number of points on the path on the top view and the vertical profile view.

* * * * *